G. W. COMBS.
MEANS FOR SUPPORTING AND CONTROLLING GYRATORY STRUCTURES.
APPLICATION FILED OCT. 11, 1911.
1,152,396.
Patented Sept. 7, 1915.
2 SHEETS—SHEET 1.
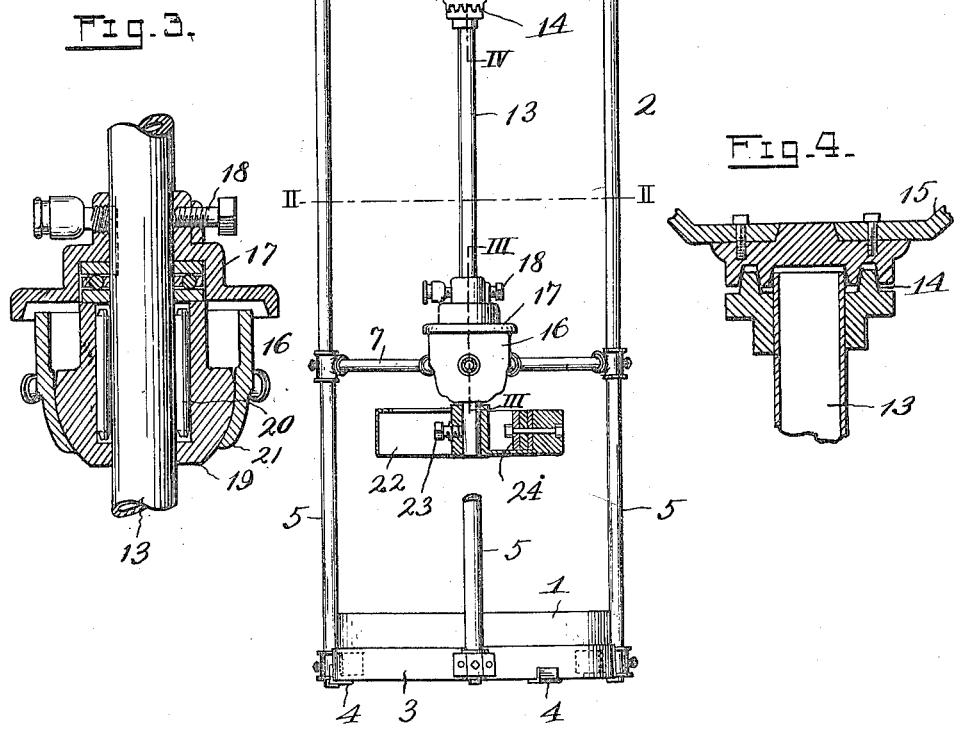
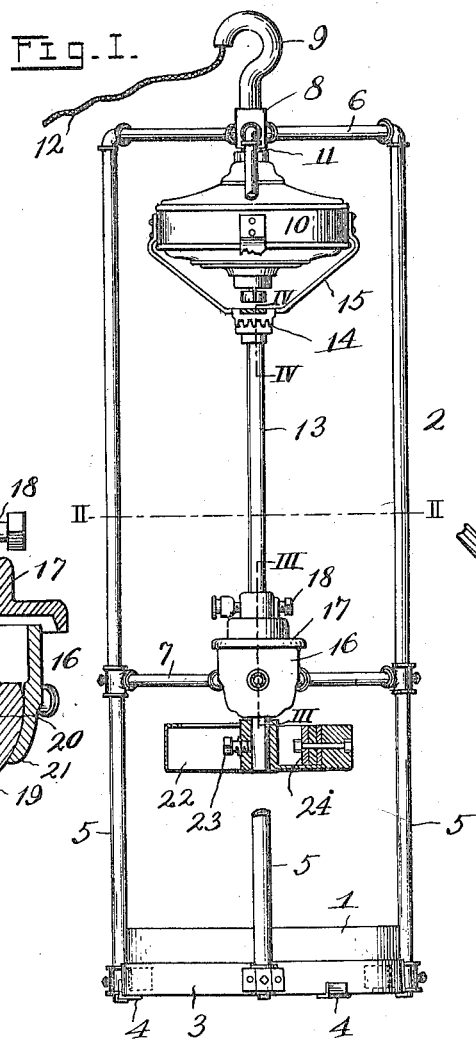
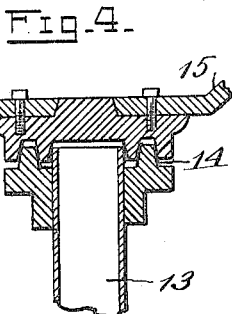
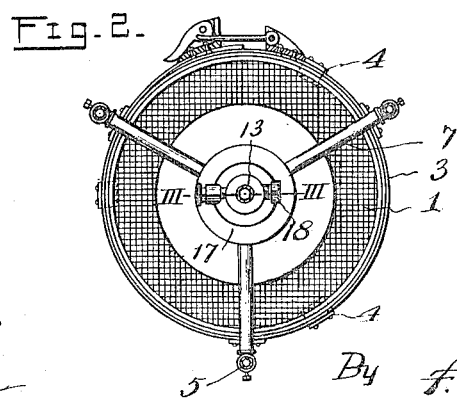
Witnesses:
E. C. Lillian
P. C. Fischer
Inventor:
G. W. Combs,
By F. G. Fischer,
Atty.

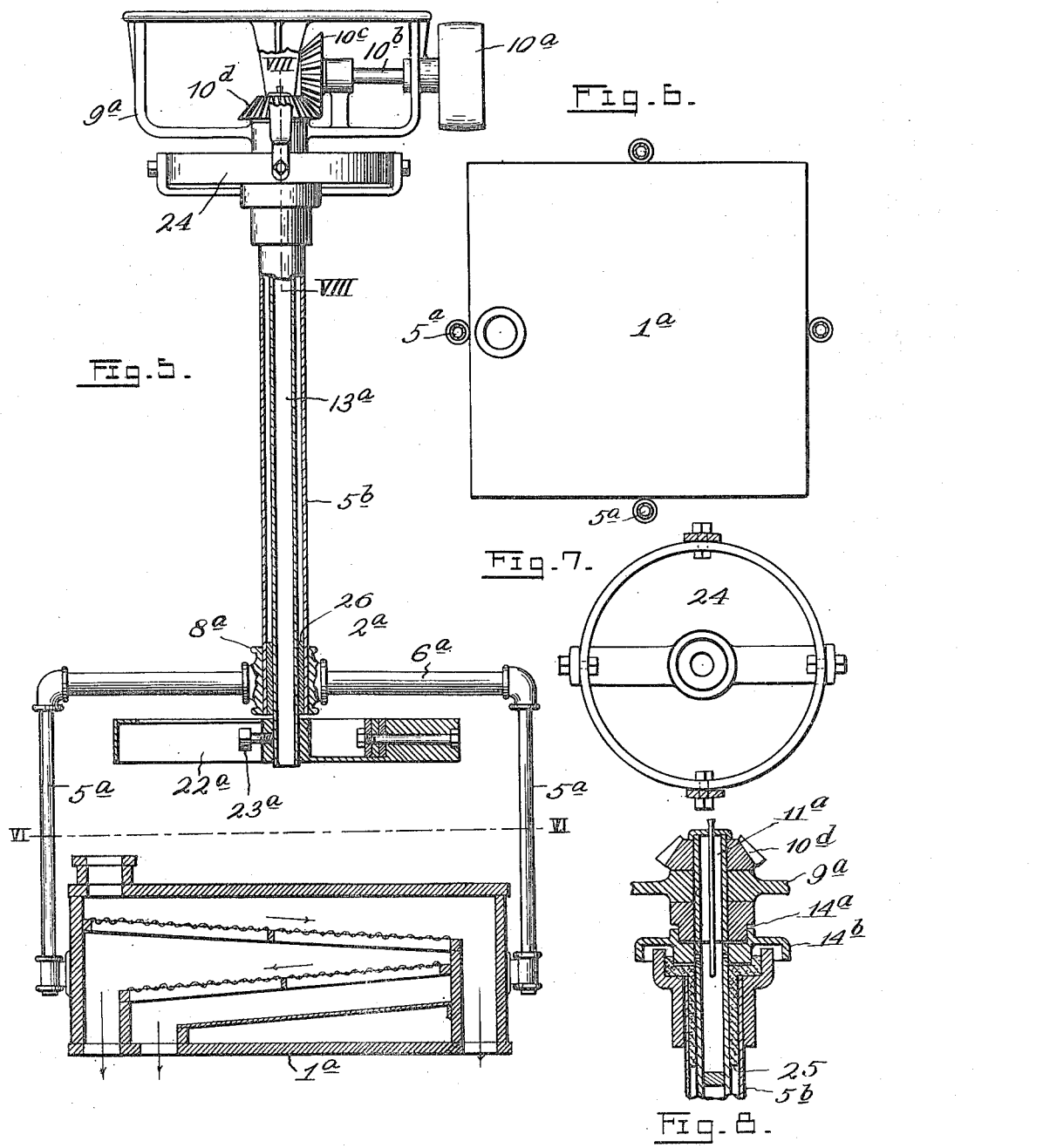

UNITED STATES PATENT OFFICE.

GEORGE W. COMBS, OF LEAVENWORTH, KANSAS.

MEANS FOR SUPPORTING AND CONTROLLING GYRATORY STRUCTURES.

1,152,396. Specification of Letters Patent. Patented Sept. 7, 1915.

Application filed October 11, 1911. Serial No. 654,033. REISSUED

*To all whom it may concern:*

Be it known that I, GEORGE W. COMBS, a citizen of the United States, residing at Leavenworth, in the county of Leavenworth and State of Kansas, have invented certain new and useful Improvements in Means for Supporting and Controlling Gyratory Structures, of which the following is a specification.

My invention relates to improvements in means for supporting and controlling gyratory structures, and my object is to provide novel means of this character for use in connection with gyratory structures employed in the separation of minerals, grain products, etc.

A further object is to provide apparatus of this character, which, while effective in operation, consists of but few, simple, parts devoid of heavy castings to render the apparatus portable, so that it can be readily taken down, or moved from place to place.

In order that the invention may be fully understood, reference will now be made to the accompanying drawings, in which:

Figure 1 is a side elevation of a gyratory structure, with an embodiment of the invention adapted thereto. Fig. 2 is a horizontal section on line II—II of Fig. 1. Fig. 3 is an enlarged vertical section of a universal coupling employed in carrying out the invention. Fig. 4 is an enlarged vertical section on line IV of Fig. 1, of a universal finger-coupling employed in carrying out the invention. Fig. 5 is a vertical section of a modified form of gyratory structure, with an embodiment of a modified form of the invention adapted thereto. Fig. 6 is a horizontal section on line VI—VI of Fig. 5. Fig. 7 is a plan view of a universal coupling employed in carrying out the invention. Fig. 8 is an enlarged vertical section on line VIII—VIII of Fig. 5.

The gyratory structure, in the present instance, is shown in the form of a container or sifter 1, suspended by a frame 2, provided at its lower end with a friction-clamp 3, in which the sifter is demountably secured, so that others of different mesh can be readily substituted therefor. Sifter 1 is supported, when clamp 3 is loose through the intermediacy of a plurality of brackets 4, secured to the lower portion of said clamp.

Frame 2, in the present instance, comprises three equally-spaced vertically-arranged members 5, three radially-disposed horizontal members 6 uniting the upper ends of members 5, three radially-disposed horizontal members 7 uniting members 5 a suitable distance above the sifter 1, and a centrally-disposed fitting 8 uniting the inner ends of the horizontal members 6, see Fig. 1. The fitting 8 has an upwardly-projecting tubular hook 9, whereby the entire apparatus may be removably supported from an overhead hook, or eye, not shown.

10 designates a driver consisting, in the present instance, of an electric motor suspended from the fitting 8 by a shaft 11 and deriving its current from a suitable source (not shown) over a flexible conductor 12, extending through the tubular hook 9 and the fitting 8, and communicating with said motor.

13 designates a centrally-disposed vertically-positioned shaft yieldingly-connected to the driver 10 through the intermediacy of a universal finger-coupling 14, having a plurality of arms 15 extending outward and upward and secured to the periphery of the driver 10. This universal finger-coupling 14, while acting positively as a transmitter of rotary motion from driver 10 to the shaft 13, is sufficiently flexible to permit the shaft 13 to remain in a vertical position, should the driver 10 for any reason leave its true horizontal position.

Shaft 13 is journaled in an antifriction ball-and-socket bearing 16, it being supported in proper relation to said bearing by a cap 17, secured to the shaft by a set-screw 18. This type of bearing prevents binding of the shaft therein, should said shaft for any reason leave a parallel position with members 5 of the frame 2. The self-adjusting member 19 of bearing 16 has anti-friction rollers 20 with which shaft 13 has contact, and the stationary socket-member 21 of said bearing is fixedly secured to the horizontal members 7 of frame 2.

22 designates an unbalancing member secured to the lower terminal of shaft 13 by a set-screw 23, and provided at one side with removable weights 24, whereby one side of said member is made heavier than the other, so that it will impart a gyratory motion to the apparatus when said member 22 is rotated.

The operation briefly stated, is as follows: When the driver 10 is in motion it drives the shaft 13, which in turn rotates the unbalancing member 22. Said unbalancing member 22, by reason of being heavier on its weighted side, moves in an orbit, or gyrates when rotated, and in turn gyrates frame 2 and the sifter 1. While frame 2 is free to move laterally in any direction, or gyrate, it is prevented from rotating with shaft 13 by the opposite sides of hook 9 contacting with the opposite sides of the hook or other supporting means, not shown.

The modified form disclosed by Figs. 5 to 8, inclusive, embodies the same principle disclosed by the preferred form of invention, the chief difference being the form of sifter, which in the modified form is especially adapted for separating flour and other grain products. Referring in detail to said modified form, 1$^a$ designates a sifter. 2$^a$ designates a frame suspending said sifter and comprising a plurality of vertical members 5$^a$ and 5$^b$ united by a plurality of horizontal members 6$^a$, and a centrally-disposed fitting 8$^a$. Member 5$^b$ is suspended from an overhead support 9$^a$, which carries the weight of the entire apparatus. 10$^a$ designates a driver fixed upon a shaft 10$^b$ journaled in the support 9$^a$ and provided at one end with a bevel-gear 10$^c$ intermeshing with a bevel-gear 10$^d$ fixed to the upper end of a vertically-positioned stub-shaft 11$^a$ journaled in the support 9$^a$. 13$^a$ designates a centrally-disposed vertically-positioned shaft yieldingly connected to the stub-shaft 11$^a$ through the intermediacy of a finger coupling 14$^a$ which supports said shaft 13$^a$. The lower member 14$^b$ of the finger-coupling 14$^a$ is supported by a universal coupling 24, which yieldingly connects the member 5$^b$ of shaft 2$^a$ to the support 9$^a$. Shaft 13$^a$ is secured at its upper end to the member 14$^b$ of the universal finger-coupling and is journaled in bearings 25 and 26 at the upper and lower ends of the tubular member 5$^b$, through which the shaft extends. 22$^a$ designates an unbalancing member secured to the lower terminal of shaft 13$^a$ by a set-screw 23$^a$, and provided with weights 24$^a$ whereby one side of said member is made heavier than the other, so that it will impart gyratory motion to the apparatus when said member 22$^a$ is rotated.

Having thus described my invention what I claim and desire to secure by Letters Patent, is:

1. The combination with a structure, suspending means therefor capable of lateral movement in any direction, means not engaging said structure but supported by said suspending means to impart gyratory motion to the structure, and a self-contained motor supported by the suspending means and operably-connected to said gyratory means.

2. The combination with a gyratory structure, suspending means therefor capable of lateral movement, a driven shaft independent of the structure but mounted in said suspending means, and means fixed to said shaft to impart gyratory motion thereto.

3. The combination with a gyratory structure, suspending means therefor capable of lateral movement, a drive shaft, and a self-adjusting bearing carrying said drive shaft and supported by the suspending means.

4. The combination with a gyratory structure, suspending means therefor capable of lateral or orbital movement, a driver independent of the structure and mounted on said suspending means, and a drive shaft independent of the structure and yieldingly connected to said driver and the suspending means.

5. The combination with a structure, suspending means therefor capable of lateral or orbital movement, a drive shaft independent of the structure and journaled in the suspending means, means mounted on said shaft to impart gyratory motion thereto, and means to prevent the suspending means from rotating with the drive shaft.

6. In combination, a vertical frame suspended from a single point for lateral movement in any direction, means for gyrating said frame, and a container supported by said frame to gyrate therewith.

7. In combination, a vertical frame, one element supporting said frame so that the same may move laterally in any direction, means for gyrating said frame, and a container supported by said frame to gyrate therewith.

8. In combination, a vertical frame, a centrally-disposed hook on said frame to freely support the same so that it may move laterally in any direction, means for gyrating said frame, and a container supported by said frame to gyrate therewith.

9. In combination, a frame suspended for lateral movement in any direction, a shaft mounted in said frame and supported thereby, means on said shaft to gyrate the frame, and a container supported by said frame to gyrate therewith.

10. In combination, a frame supported for gyration, a container, a friction-clamp carried by the frame and adapted to firmly embrace said container, and brackets on said friction-clamp to support the container when released from the friction-clamp.

11. In combination, a frame supported for gyration from a single point, a container, and a flexible clamp on the frame to removably-secure said container thereto.

12. The combination with a gyratory structure, suspending means therefor capable of lateral movement in any direction, a self-adjusting bearing carried by said suspending means, a driven shaft journaled in said self-adjusting bearing, said shaft being independent of the gyratory structure, and an eccentric weight on said shaft to impart gyratory motion thereto.

13. In combination, a gyratory structure, suspending means therefor capable of lateral movement in any direction, a self adjusting bearing carried by said suspending means, a shaft journaled in said bearing, means on said shaft to impart gyratory motion to the suspending means, a motor mounted in the suspending means, and a yielding connection between said motor and the shaft whereby the latter is driven by the former.

14. In combination, a gyratory structure, and one element which performs the dual function of freely suspending said structure and preventing the same from rotating.

15. In combination, a container free to move laterally in any direction, and one element which performs the dual function of freely suspending said container and preventing the same from rotating.

16. In combination, a freely swinging frame, a sieve mounted therein, a motor mounted on said frame, and means actuated by said motor to impart motion to the frame.

17. In combination, a container, supporting means for said container, and means connected to said supporting means to actuate the same.

18. In combination, a container, means embracing said container to removably hold the same, a support for said embracing means capable of lateral movement, and means for actuating said support.

19. In combination, a container free to move laterally in any direction, a single support for said container capable of securing the latter from axial rotation, and a motor for actuating said support.

20. In combination, a structure, single supporting means for said structure, actuating means for said supporting means, a driver for said actuating means, and power transmission devices operably-connecting said driver and the actuating means.

21. A container free to move laterally in any direction, adjustable means to hold said container, a support for said adjustable means, and means for actuating said support.

22. In combination, a container free to move laterally in any direction, and supporting means carried from a single point and performing the dual function of supporting said container and preventing the same from rotating.

In testimony whereof I affix my signature, in the presence of two witnesses.

GEORGE W. COMBS.

Witnesses:
F. G. FISCHER,
E. C. LILLIAN.